US009597845B2

(12) United States Patent
Elliott et al.

(10) Patent No.: US 9,597,845 B2
(45) Date of Patent: Mar. 21, 2017

(54) METHOD OF MAKING A COMPOSITE ARTICLE HAVING AN INTERNAL PASSAGEWAY

(71) Applicant: Textron Innovations Inc., Providence, RI (US)

(72) Inventors: David A. Elliott, Azle, TX (US); Charles J. Kilmain, Fort Worth, TX (US); Sherman S. Lin, North Richland Hills, TX (US); Ron Measom, Hurst, TX (US); Walter Riley, Richardson, TX (US)

(73) Assignee: Textron Innovations Inc., Providence, RI (US)

( * ) Notice: Subject to any disclaimer, the term of this patent is extended or adjusted under 35 U.S.C. 154(b) by 0 days.

(21) Appl. No.: 14/810,689

(22) Filed: Jul. 28, 2015

(65) Prior Publication Data

US 2015/0328874 A1    Nov. 19, 2015

Related U.S. Application Data

(62) Division of application No. 13/641,290, filed on Oct. 15, 2012, now Pat. No. 9,090,042.

(51) Int. Cl.
*B29C 70/48* (2006.01)
*B32B 3/30* (2006.01)
*B29C 70/86* (2006.01)
*B29C 67/00* (2006.01)

(52) U.S. Cl.
CPC .......... *B29C 70/48* (2013.01); *B29C 67/0085* (2013.01); *B29C 70/865* (2013.01); *B32B 3/30* (2013.01); *Y10T 156/1064* (2015.01)

(58) Field of Classification Search
CPC ... B29C 67/0085; B29C 70/48; B29C 70/865; B32B 3/30; Y10T 156/1064
See application file for complete search history.

(56) References Cited

U.S. PATENT DOCUMENTS

| | | | |
|---|---|---|---|
| 5,204,042 | A | 4/1993 | James et al. |
| 5,505,492 | A | 4/1996 | Nelson et al. |
| 6,114,014 | A | 9/2000 | Ikeda et al. |
| 6,513,753 | B1 | 2/2003 | Toni et al. |
| 6,544,367 | B1 | 4/2003 | Fujimoto et al. |
| 6,632,502 | B1 | 10/2003 | Allen et al. |

(Continued)

OTHER PUBLICATIONS

Canadian Search Report dated Apr. 2, 2013 from counterpart CA App. No. 2,798,185.

(Continued)

*Primary Examiner* — Mark A Osele
*Assistant Examiner* — Christopher C Caillouet
(74) *Attorney, Agent, or Firm* — James E. Walton

(57) ABSTRACT

In one particular embodiment, a method for making a fiber-reinforced, composite article having an internal passageway includes providing a layup tool, fiber placing a base layup onto the layup tool, and generating a groove in the base layup. The method further includes placing a mandrel in the groove, fiber placing a top layup onto the base layup and the mandrel, curing the base layup and the top layup, and removing the mandrel from the base layup and the top layup. In another particular embodiment, the mandrel is replaced with a non-removable tube.

9 Claims, 4 Drawing Sheets

(56) References Cited

U.S. PATENT DOCUMENTS 7,204,951 B2* 4/2007 Simpson .............. B29C 70/342
264/257

OTHER PUBLICATIONS

Chinese Search Report dated Mar. 5, 2014 from counterpart CN App. No. 20108000667091.
Supplementary European Search Report dated Feb. 21, 2013 from counterpart EP App. No. 10851510.7.
International Preliminary Report on Patentability dated Jul. 9, 2010 from counterpart International App. No. PCT/US2010/034643.
International Search Report and Written Opinion dated May 13, 2010 from counterpart International App. No. PCT/US2010/034643.
Restriction Requirement dated Sep. 11, 2014 from counterpart U.S. Appl. No. 13/641,290.
Response to Restriction Requirement dated Nov. 7, 2014 from counterpart U.S. Appl. No. 13/641,290.
Office Action dated Dec. 18, 2014 from counterpart U.S. Appl. No. 13/641,290.
Amendment dated Feb. 27, 2015 from counterpart U.S. Appl. No. 13/641,290.
Notice of Allowance dated Mar. 13, 2015 from counterpart U.S. Appl. No. 13/641,290.

* cited by examiner

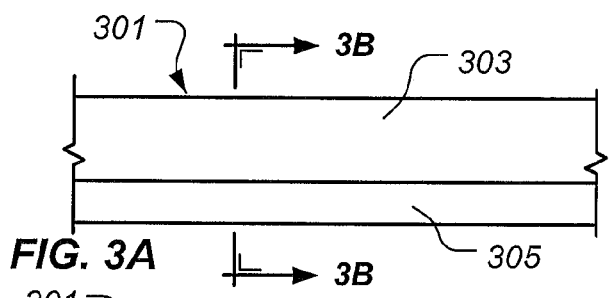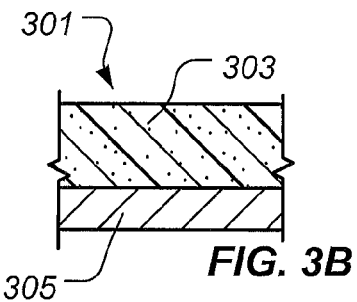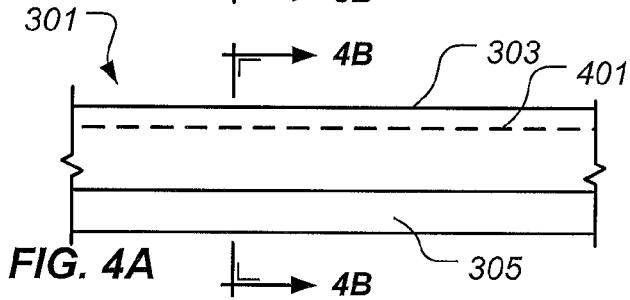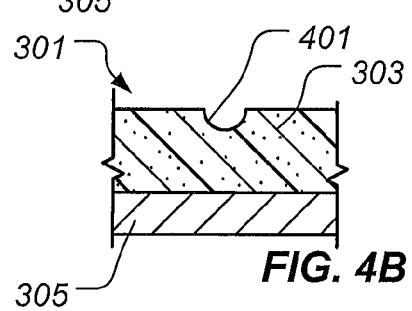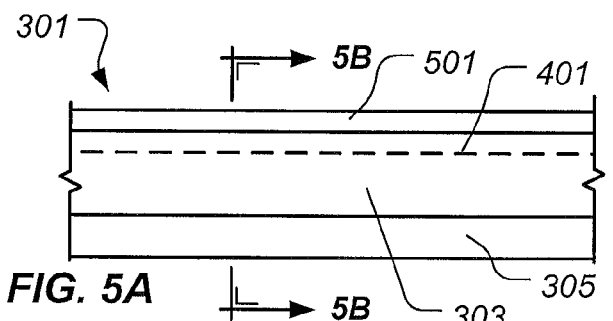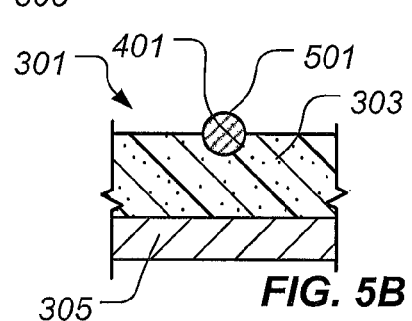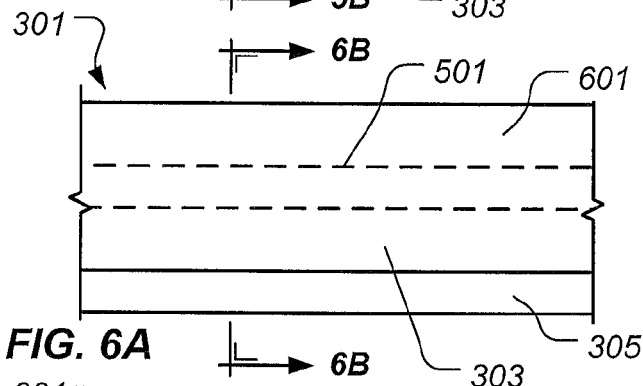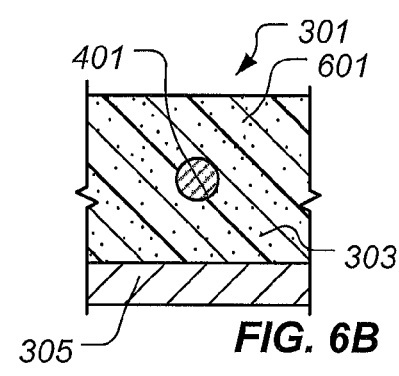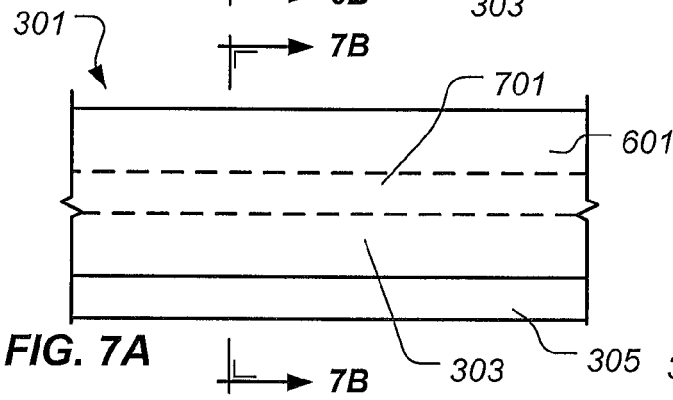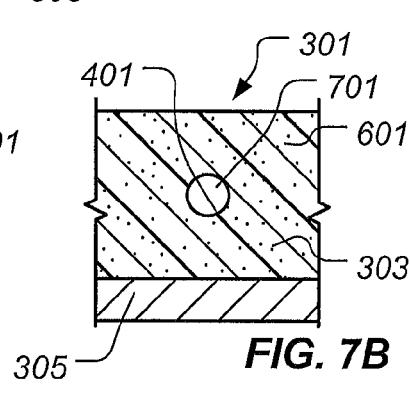

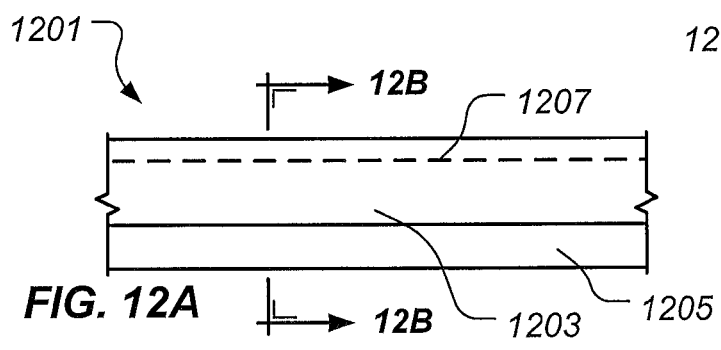
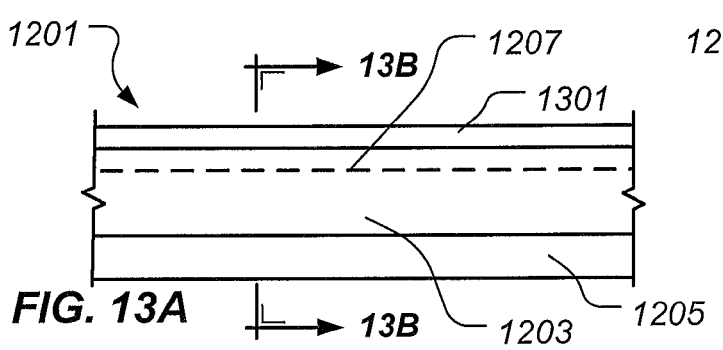
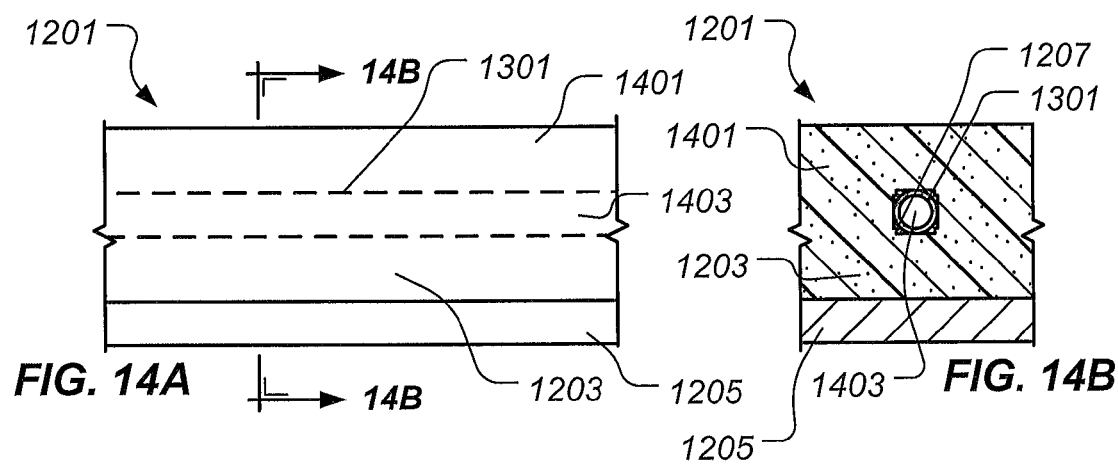

METHOD OF MAKING A COMPOSITE ARTICLE HAVING AN INTERNAL PASSAGEWAY

BACKGROUND

1. Field of the Invention

The present application relates in general to the field of composite articles.

2. Description of Related Art

Many conventional articles include internal passageways that are used, for example, to communicate fluids from one location to another location. One example of such an article is a transmission case, such as a transmission case for a rotorcraft. Such conventional articles are typically made from metallic materials and are formed using casting processes. These metallic articles are often heavy, due to the mechanical properties required of the articles in service. Moreover, the patterns required to make the molds used to form the castings are expensive, require long lead times, and may be difficult to manufacture. Furthermore, changes to the patterns are expensive.

While fiber-reinforced, polymeric, composite articles are known to be lighter weight than their metallic counterparts, making composite articles with internal passageways is very difficult, time consuming, and expensive.

There are many ways to make articles having internal passageways well known in the art; however, considerable room for improvement remains.

DESCRIPTION OF THE DRAWINGS

The novel features believed characteristic of the application are set forth in the appended claims. However, the application itself, as well as a preferred mode of use, and further objectives and advantages thereof, will best be understood by reference to the following detailed description when read in conjunction with the accompanying drawings, in which the leftmost significant digit(s) in the reference numerals denote(s) the first figure in which the respective reference numerals appear, wherein:

FIGS. 3A-7B are stylized views depicting a preferred embodiment of a method for making a fiber-reinforced, polymeric, composite article having internal passageways;

FIGS. 12A-14B are stylized views depicting another alternative embodiment of a method for making a fiber-reinforced, polymeric, composite article having internal passageways.

Figure 1:
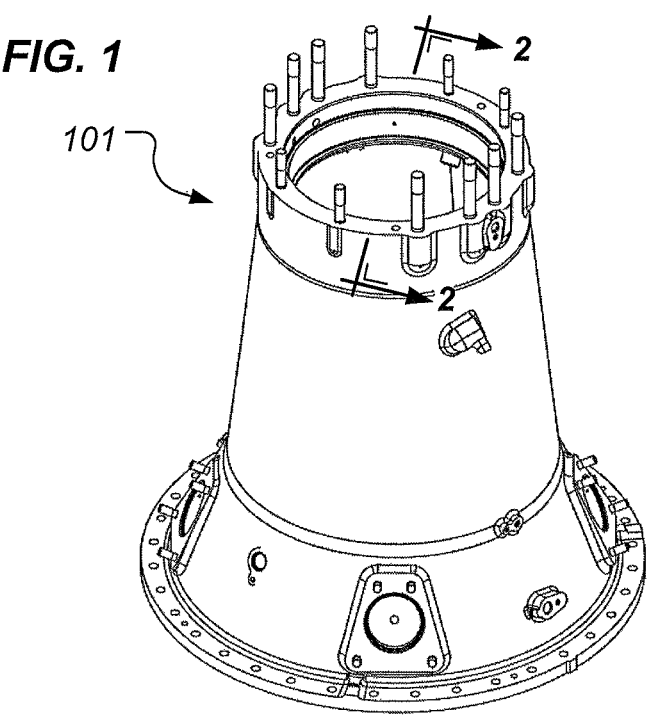
FIG. 1 is a perspective view of an exemplary article having internal passageways.

While the application is susceptible to various modifications and alternative forms, specific embodiments thereof have been shown by way of example in the drawings and are herein described in detail. It should be understood, however, that the description herein of specific embodiments is not intended to limit the application to the particular forms disclosed, but on the contrary, the intention is to cover all modifications, equivalents, and alternatives falling within the spirit and scope of the application as defined by the appended claims.

DETAILED DESCRIPTION OF THE PREFERRED EMBODIMENT

Illustrative embodiments of the application are described below. In the interest of clarity, not all features of an actual implementation are described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

For the purposes of this disclosure, the term "fiber placement" means a process for fabricating composite shapes, often having complex contours and/or cutouts, by means of a device that lays preimpregnated fibers in tow form onto a mandrel or tool. The term "tow" means a bundle of continuous filaments or fibers, such as carbon, glass, aramid, or other such fibers. It should be appreciated that even though a fiber placement process is the preferred composite manufacturing process, other composite manufacturing processes may be used. For example, a resin transfer molding process which involves using braided fibers, without being impregnated with resin, are placed in a selected pattern within a mold. Further, resin is transferred into the mold such that the fibers and resin are combined, and then cured. Such a resin transfer molding process is an example of composite manufacturing process that is a variation of a fiber placement process, but compatible with the embodiments disclosed herein.

In one particular embodiment, a method for making a fiber-reinforced, composite article having an internal passageway includes providing a layup tool, fiber placing a base layup onto the layup tool, and generating a groove in the base layup. The method further includes placing a mandrel in the groove, fiber placing a top layup onto the base layup and the mandrel, curing the base layup and the top layup, and removing the mandrel from the base layup and the top layup. In another particular embodiment, a method for making a fiber-reinforced, composite article having an internal passageway includes providing a layup tool, fiber placing a base layup onto the layup tool, and generating a groove in the base layup. The method further includes placing a tube in the groove, fiber placing a top layup onto the base layup and the tube, and curing the base layup and the top layup.

Figure 2:
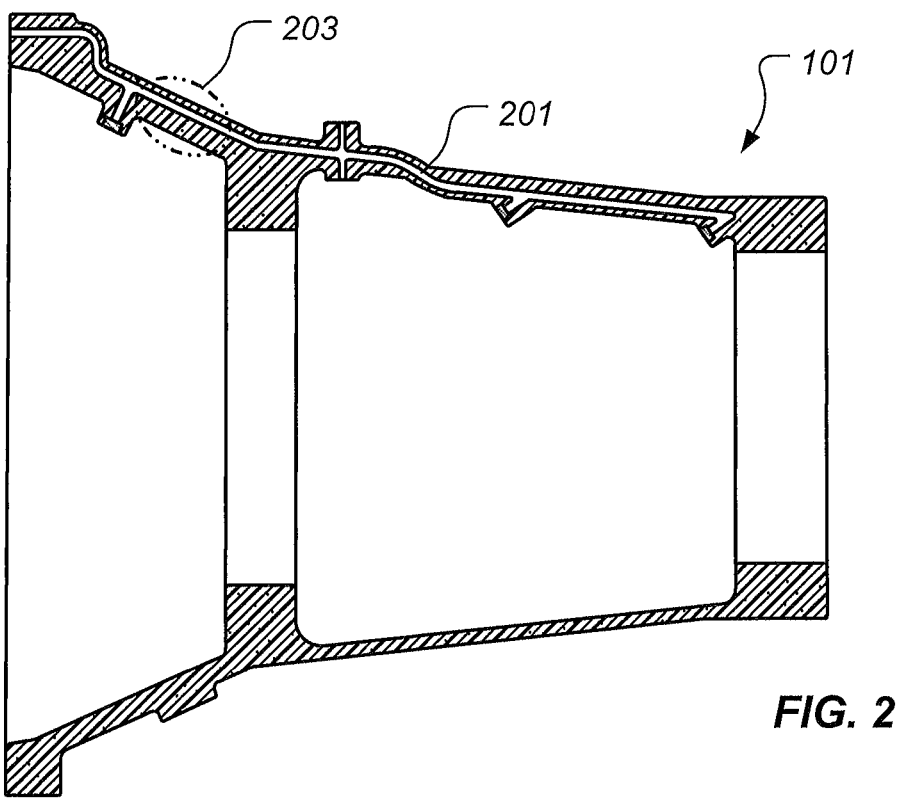
FIG. 2 is a cross-sectional view of the article of FIG. 1.

FIG. 1 depicts a perspective view of a particular embodiment of a fiber-reinforced, polymeric, composite article having internal passageways. The particular illustrated article is a transmission case 101 for a rotorcraft (not shown). FIG. 2 is a cross-sectional view of transmission case 101 taken along the line 2-2 in FIG. 1, which illustrates an internal passageway 201 defined by transmission case 101.

FIGS. 3A-7B are stylized views depicting a preferred embodiment of a method for making a fiber-reinforced, polymeric, composite article, such as transmission case 101 of FIG. 1. Specifically, FIGS. 3A, 4A, 5A, 6A, and 7A are stylized, side, elevational views depicting a portion 301 of a fiber-reinforced, polymeric, composite article, such as a portion 203 of transmission case 101 (shown in FIG. 2) at various stages of manufacture. FIGS. 3B, 4B, 5B, 6B, and 7B are stylized, cross-sectional views of portion 301 at stages of manufacture corresponding to FIGS. 3A, 4A, 5A, 6A, and 7A, respectively. Thus, Figure xB is a stylized, cross-sectional view taken along the line xB-xB in Figure xA, wherein "x" is 3, 4, 5, 6, or 7. For example, FIG. 3B is a stylized, cross-sectional view taken along the line 3B-3B in FIG. 3A.

Referring to FIGS. 3A and 3B, a base layup 303 of portion 301 is fiber placed onto a tool or mold 305. It should be noted that base layup 303 comprises a plurality of plies or layers of uncured, fiber-reinforced, composite material having desired orientations. As shown in FIGS. 4A and 4B, a groove 401 is formed in base layup 303 to receive a mandrel 501 (best shown in FIG. 5B). Preferably, groove 401 is formed by a material removal process, such as by cutting, machining, milling, or the like. Turning now to FIGS. 5A and 5B, mandrel 501 is placed in groove 401. Mandrel 501 preferably comprises a eutectic material, the eutectic material being a metal composition which transforms from a solid state to a liquid state at relatively low temperature. Mandrel 501 may be form from other materials, for example, mandrel 501 may be an elastomeric material, such as a silicone elastomer; a water-soluble material, such as a salt; or the like. As shown in FIGS. 6A and 6B, a top layup 601 is then fiber-placed over base layup 303 and mandrel 501. As with base layup 303, top layup 601 comprises a plurality of plies or layers of uncured, fiber-reinforced, composite material having desired orientations. Base layup 303 and top layup 601 are cured, such as with pressure and heat, with mandrel 501 in place. As shown in FIGS. 7A and 7B, mandrel 501 is removed to produce portion 301 having an internal passageway 701, corresponding to internal passageway 201 of transmission case 101. When mandrel 501 is a eutectic material, then mandrel 501 is exposed to a temperature which melts the eutectic material, allowing mandrel 501 to be removed as a liquid, thereby producing internal passageway 201. Similarly, when mandrel 501 is a water-soluble material, mandrel 501 is exposed to water, thereby dissolving mandrel 501 and producing internal passageway 201.

FIGS. 8A-11B are stylized views depicting an alternative embodiment of a method for making a fiber-reinforced, polymeric, composite article, such as transmission case 101 of FIG. 1. In this embodiment, a tube 1001 (shown in FIGS. 10A-10C) forms an internal passageway 1103 (shown in FIGS. 11A and 11B), rather than base layup 303 and top layup 601 defining internal passageway 701 in the first embodiment described above and shown in FIGS. 3A-7B. Specifically, FIGS. 8A, 9A, 10A, and 11A are stylized, side, elevational views depicting a portion 801 of a fiber-reinforced, polymeric, composite article, such as a portion 203 of transmission case 101 (shown in FIG. 2) at various stages of manufacture. FIGS. 8B, 9B, 10B, and 11B are stylized, cross-sectional views of portion 801 at stages of manufacture corresponding to FIGS. 8A, 9A, 10A, and 11A, respectively. Thus, Figure xB is a stylized, cross-sectional view taken along the line xB-xB in Figure xA, wherein "x" is 8, 9, 10, or 11. For example, FIG. 8B is a stylized, cross-sectional view taken along the line 8B-8B in FIG. 8A.

Figure 8A:
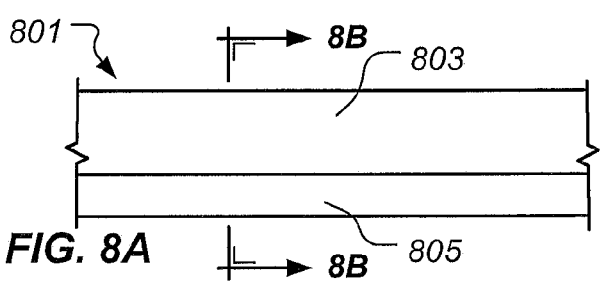
FIGS. 8A-11B are stylized views depicting an alternative embodiment of a method for making a fiber-reinforced, polymeric, composite article having internal passageways.
Figure 8B:
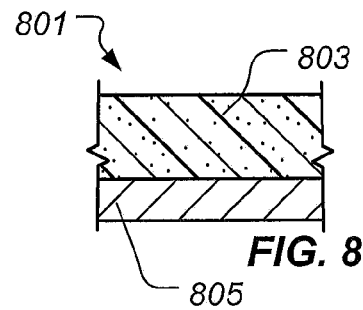
Figure 9A:
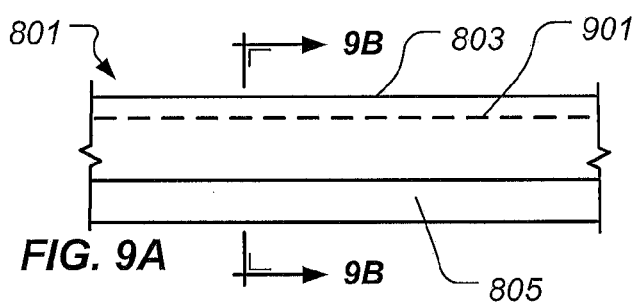
Figure 9B:
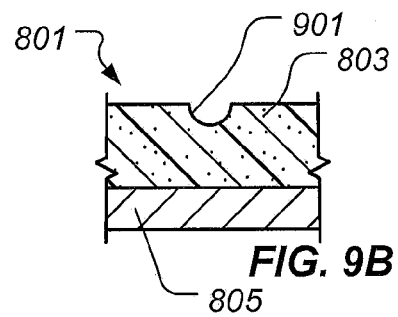
Figure 10A:
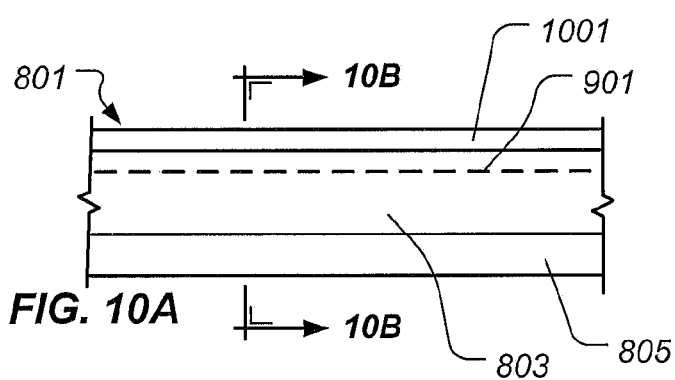
Figure 10B:
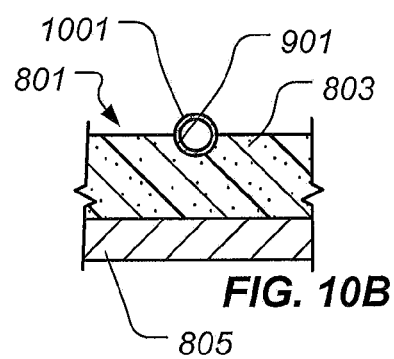
Figure 10C:
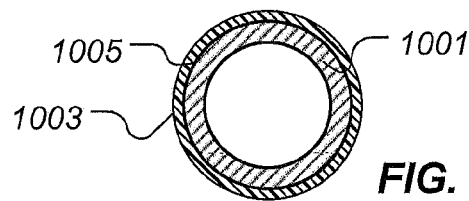
Figure 11A:
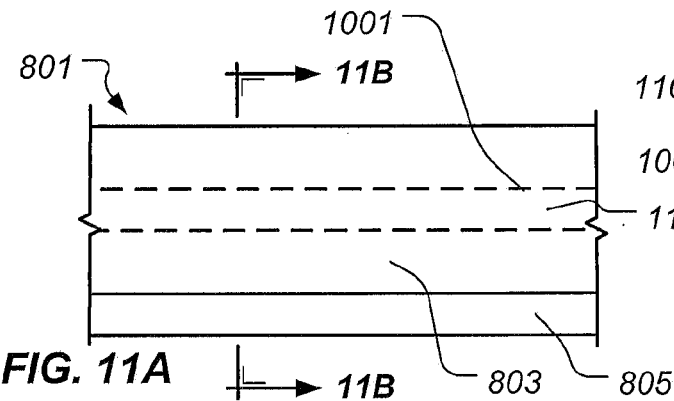
Figure 11B:
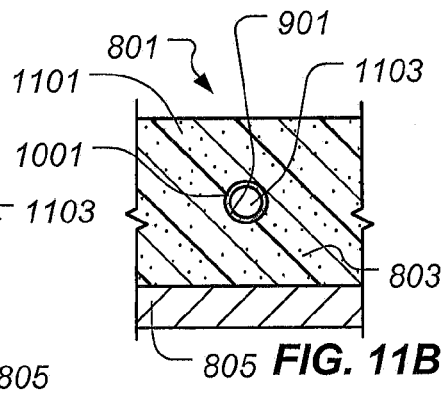

Referring to FIGS. 8A and 8B, a base layup 803 of portion 801 is fiber placed onto a tool or mold 805. It should be noted that base layup 803 comprises a plurality of plies or layers of uncured, fiber-reinforced, composite material having desired orientations. As shown in FIGS. 9A and 9B, a groove 901 is formed in base layup 803 to receive a tube 1001 (best shown in FIG. 10B). Preferably, groove 901 is formed by a material removal process, such as by cutting, machining, milling, or the like. Turning now to FIGS. 10A and 10B, tube 1001 is placed in groove 901. Tube 1001 comprises any material suitable for transporting a fluid, such as, but not limited to, hydraulic fluid or the like. As shown in FIG. 10C, an adhesive 1003 may be disposed on an outer surface 1005 of tube 1001. As shown in FIGS. 11A and 11B, a top layup 1101 is then fiber-placed over base layup 803 and tube 1001. As with base layup 803, top layup 1101 comprises a plurality of plies or layers of uncured, fiber-reinforced, composite material having desired orientations. Base layup 803 and top layup 1101 are cured, such as with pressure and heat, with tube 1001 in place to form portion 801 having an internal passageway 1103, corresponding to internal passageway 201 of transmission case 101.

FIGS. 12A-14B are stylized views depicting another alternative embodiment of a method for making a fiber-reinforced, polymeric, composite article, such as transmission case 101 of FIG. 1. In this embodiment, a groove 1207 (best shown in FIG. 12B) is formed using a fiber-placement process, rather than groove 401 or 901 being formed by a material removal process, as describe in relation to the first and second illustrated embodiments depicted in FIGS. 3A-7B and 8A-11B, respectively. Specifically, FIGS. 12A, 13A, and 14A are stylized, side, elevational views depicting a portion 1201 of a fiber-reinforced, polymeric, composite article, such as a portion 203 of transmission case 101 (shown in FIG. 2) at various stages of manufacture. FIGS. 12B, 13B, and 14B are stylized, cross-sectional views of portion 1201 at stages of manufacture corresponding to FIGS. 12A, 13A, and 14A, respectively. Thus, Figure xB is a stylized, cross-sectional view taken along the line xB-xB in Figure xA, wherein "x" is 12, 13, or 14. For example, FIG. 12B is a stylized, cross-sectional view taken along the line 12B-12B in FIG. 12A.

Referring to FIGS. 12A and 12B, a base layup 1203 of portion 1201 is fiber placed onto a tool or mold 1205. It should be noted that base layup 1203 comprises a plurality of plies or layers of uncured, fiber-reinforced, composite material having desired orientations. During the fiber placement process, groove 1207 is formed in base layup 1203 using a fiber placement process to receive a tube 1301 (best shown in FIG. 13B). Turning now to FIGS. 13A and 13B, a tube 1301 is placed in groove 1207. Tube 1301 comprises any material suitable for transporting a fluid, such as, but not limited to, hydraulic fluid or the like. Preferably, as shown in FIG. 10C, an adhesive, such as adhesive 1003, may be disposed on an outer surface 1303 of tube 1301. As shown in FIGS. 14A and 14B, a top layup 1401 is then fiber-placed over base layup 1203 and tube 1301. As with base layup 1203, top layup 1401 comprises a plurality of plies or layers of uncured, fiber-reinforced, composite material having desired orientations. Base layup 1203 and top layup 1401 are cured, such as with pressure and heat, with tube 1301 in place to form portion 1201 having an internal passageway 1403, corresponding to internal passageway 201 of transmission case 101.

It should be noted that the process of forming groove 401 (best shown in FIG. 4B) can also be accomplished using a fiber placement process, rather than a material removal process.

It should also be noted that fiber placement tools 305, 805, and 1205 are lower cost, easier to manufacture, require less lead-time to manufacture, and are easier, less costly, and less time-consuming to change than conventional casting tooling.

The present application provides significant advantages, including: (1) providing an article having an internal passageway that is lighter than corresponding metallic articles; (2) providing a transmission case having an internal passageway that is lighter than corresponding metallic transmission cases; (3) providing a means for producing articles with tooling that is easier to make, less costly, and easier to change than conventional casting tooling.

The particular embodiments disclosed above are illustrative only, as the application may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the application. Accordingly, the protection sought herein is as set forth in the claims below. It is apparent that an application with significant advantages has been described and illustrated. Although the present application is shown in a limited number of forms, it is not limited to just these forms, but is amenable to various changes and modifications without departing from the spirit thereof.

What is claimed is:

1. A method for making a fiber-reinforced composite article having an internal passageway, comprising:
providing a layup tool;
placing a base layup onto the layup tool;
generating a groove in the base layup;
placing a tube in the groove;
placing a top layup onto the base layup and the tube; and
curing the base layup and the top layup;
wherein generating the groove in the base layup is accomplished by a material removal process;
wherein the base layup is comprised of a plurality of plies of uncured, fiber-reinforced, composite material; and
wherein the top layup is comprised of a plurality of plies of uncured, fiber-reinforced, composite material.

2. The method according to claim 1, wherein the material removal process is one of cutting, machining, and milling.

3. The method according to claim 1, wherein the placing the base layup onto the layup tool, and the placing the top layup onto the base layup and the tube, is accomplished in a resin transfer molding process.

4. The method according to claim 1, wherein the placing the base layup onto the layup tool, and the placing the top layup onto the base layup and the tube, is accomplished in a fiber placement process.

5. The method according to claim 1, wherein generating the groove in the base layup is accomplished during the placing the base layup onto the layup tool.

6. The method according to claim 1, further comprising applying an adhesive to an outer surface of the tube before placing the tube in the groove.

7. The method according to claim 1, wherein the fiber-reinforced composite article is a transmission case for a rotorcraft.

8. The method according to claim 1, wherein the tube is configured to transport a fluid therethrough.

9. The method according to claim 8, wherein the fluid is hydraulic fluid.

* * * * *